(12) United States Patent
Palanca et al.

(10) Patent No.: US 9,342,310 B2
(45) Date of Patent: *May 17, 2016

(54) MFENCE AND LFENCE MICRO-ARCHITECTURAL IMPLEMENTATION METHOD AND SYSTEM

(71) Applicant: Intel Corporation, Santa Clara, CA (US)

(72) Inventors: Salvador Palanca, Folsom, CA (US); Stephen A. Fischer, Gold River, CA (US); Subramaniam Maiyuran, Gold River, CA (US); Shekoufeh Oawami, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/838,229

(22) Filed: Mar. 15, 2013

(65) Prior Publication Data

US 2013/0205117 A1 Aug. 8, 2013

Related U.S. Application Data

(63) Continuation of application No. 13/440,096, filed on Apr. 5, 2012, which is a continuation of application No. 10/654,573, filed on Sep. 2, 2003, now Pat. No. 8,171,261, which is a continuation of application No. 10/194,531, filed on Jul. 12, 2002, now Pat. No. 6,651,151, which is a continuation of application No. 09/475,363, filed on Dec. 30, 1999, now Pat. No. 6,678,810.

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC ........ *G06F 9/30145* (2013.01); *G06F 9/30043* (2013.01); *G06F 9/30047* (2013.01); *G06F 9/30087* (2013.01); *G06F 9/3834* (2013.01); *G06F 9/3836* (2013.01); *G06F 9/3855* (2013.01); *G06F 9/3857* (2013.01)

(58) Field of Classification Search
None
See application file for complete search history.

(56) References Cited

U.S. PATENT DOCUMENTS

| | | | |
|---|---|---|---|
| 4,775,955 A | | 10/1988 | Liu et al. |
| 5,193,167 A | * | 3/1993 | Sites et al. ..................... 711/163 |

(Continued)

FOREIGN PATENT DOCUMENTS

WO WO-9706608 3/1997

OTHER PUBLICATIONS

Weaver et al. (The SPARC Architecture Manual: Version 9, Published 1994, pp. 1-369).*

(Continued)

*Primary Examiner* — George Giroux
(74) *Attorney, Agent, or Firm* — Vecchia Patent Agent, LLC

(57) ABSTRACT

A system and method for fencing memory accesses. Memory loads can be fenced, or all memory access can be fenced. The system receives a fencing instruction that separates memory access instructions into older accesses and newer accesses. A buffer within the memory ordering unit is allocated to the instruction. The access instructions newer than the fencing instruction are stalled. The older access instructions are gradually retired. When all older memory accesses are retired, the fencing instruction is dispatched from the buffer.

19 Claims, 5 Drawing Sheets

(56) References Cited

U.S. PATENT DOCUMENTS

| | | | |
|---|---|---|---|
| 5,265,233 A | | 11/1993 | Frailong et al. |
| 5,636,374 A | | 6/1997 | Rodgers et al. |
| 5,675,724 A | | 10/1997 | Beal et al. |
| 5,694,553 A | | 12/1997 | Abramson et al. |
| 5,694,574 A | | 12/1997 | Abramson et al. |
| 5,724,536 A | | 3/1998 | Abramson et al. |
| 5,751,996 A | | 5/1998 | Glew et al. |
| 5,778,245 A | | 7/1998 | Papworth et al. |
| 5,790,398 A | * | 8/1998 | Horie ................................ 700/4 |
| 5,802,575 A | | 9/1998 | Greenley et al. |
| 5,802,757 A | | 9/1998 | Duval et al. |
| 5,826,109 A | | 10/1998 | Abramson et al. |
| 5,857,210 A | * | 1/1999 | Tremblay et al. ..................... 1/1 |
| 5,860,126 A | | 1/1999 | Mittal |
| 5,881,262 A | | 3/1999 | Abramson et al. |
| 5,898,854 A | | 4/1999 | Abramson et al. |
| 5,903,740 A | | 5/1999 | Walker et al. |
| 6,006,325 A | * | 12/1999 | Burger et al. ................. 712/214 |
| 6,038,646 A | | 3/2000 | Sproull |
| 6,047,334 A | * | 4/2000 | Langendorf et al. .............. 710/5 |
| 6,073,210 A | | 6/2000 | Palanca et al. |
| 6,088,771 A | | 7/2000 | Steely, Jr. et al. |
| 6,088,772 A | * | 7/2000 | Harriman et al. ............. 711/158 |
| 6,148,083 A | | 11/2000 | Fieres et al. |
| 6,148,394 A | | 11/2000 | Tung et al. |
| 6,189,089 B1 | | 2/2001 | Walker et al. |
| 6,216,215 B1 | | 4/2001 | Palanca et al. |
| 6,223,258 B1 | | 4/2001 | Palanca et al. |
| 6,233,657 B1 | | 5/2001 | Ramagopal et al. |
| 6,266,767 B1 | | 7/2001 | Feiste et al. |
| 6,286,095 B1 | | 9/2001 | Morris et al. |
| 6,356,270 B2 | | 3/2002 | Pentkovski et al. |
| 6,546,462 B1 | | 4/2003 | Palanca et al. |
| 6,636,950 B1 | | 10/2003 | Mithal et al. |
| 6,651,151 B2 | | 11/2003 | Palanca et al. |
| 6,678,810 B1 | | 1/2004 | Palanca et al. |
| 6,708,269 B1 | | 3/2004 | Tiruvallur et al. |
| 6,754,751 B1 | | 6/2004 | Willke |
| 6,862,679 B2 | | 3/2005 | Hacking et al. |
| 8,959,314 B2 | | 2/2015 | Palanca et al. |

OTHER PUBLICATIONS

Alpha 21284 Microprocessor Hardware Refernce Manual, Compaq Computer Corporation, Order No. EC-RJRZA-TE, (Jul. 1999).

Goodman, "Cache Consistency and Sequential Consistency", (1989), pp. 1-4.

Thakkar, Shreekant, "The Internet Streaming SIMD Extensions", Intel Technology Journal, Retrieved on Nov. 11, 1999, Legal Information © 1999, pp. 1-8, from http://support.intel.com/technology/iti/q21999/articles/art_1a.htm.

Advanced Micro Devices, Inc. "AMD-3D Technology Manual", (Feb. 1998), pp. i-x, 1-58.

Barad, Haim, et al., Intel's Multimedia Architecture Extension, Nineteenth Convention of Electrical and Electronics Engineers in Israel, (1996), pp. 145-151.

Control Data Corporation,"Control Data 6400/6500/6600 Computer Systems Reference Manual", Publication No. 60100000, (1967) 159 pages.

Convex Computer Corporation, "C4/XA Architecture Overiew", Convex Technical Marketing, (Feb. 1994), 279 pages.

Intel Corporation, "i860 Microprocessor Family Programmer's Reference Manual", (1992), Ch. 1, 3, 8 & 12.

Intel Corporation, "Intel 80386 Programmer's Reference Manual", (1986), 421 pages.

Intel Corporation "Pentium Processor User's Manual", vol. 3: Architecture and Programming Manual (1993). Ch. 1, 3-4, 6, 8 & 18.

Kohn L., et al., "The Visual Instruction Set (VIS) in UltraSPARC", SPARC Technology Business-Sun Microsystems, Inc.,(1995), pp. 462-469.

Lawrence Livermore Laboratory, "S-1 Uniprocessor Architecture", Apr. 21, 1983, 386 pages.

Lawrence Livermore Laboratory, "vol. I: Architecture—The 1979 Annual Report—The S-1 Project", (1979), 443 pages.

Lawrence Livermore Laboratory, "vol. II: Hardware—The 1979 Annual Report—The S-1 Project", (1979), 366 pages.

Motorola, Inc., "MC88110 Second Generation RISC Microprocessor User's Manual", MC8110UM/AD, (1991), 619 pages.

Philips Electronics, "TriMedia TM1000 Preliminary Data Book", (1997), 496 pages.

Samsung Electronics, "21164 Alpha Microprocessor Data Sheet", (1997), 121 pages.

Shipnes, J., Graphics Processing with the 88110 RISC Microprocessor, IEEE, (1992), pp. 169-174.

Sun Microsystems, Inc., "VIS Visual Instruction Set User's Manuel", Part #805-1394-01, (Jul. 1997), pp. i-xii, pp. 1-136.

Sun Microsystems, Inc., "Visual Instruction Set (VIS) User's Guide", Version 1.1, (Mar. 1997),pp. i-xii, pp. 1-127.

Texas Instruments, "TMS320C2X User's Guide", (1993), pp. 3:2-3:11: 3:28-3:34; 4:1-4:22; 4:41; 4:103; 4:119-4:120; 4:122; 4:150-4:151.

Texas Instruments, "TM320C80 (MVP) Master Processor User's Guide", (1995), 595 pages.

Texas Instruments, "TM320C80 (MVP) Parallel Processor User's Guide", (1995), 705 pages.

Final Office Action received for U.S. Appl. No. 10/654,573, mailed on Apr. 20, 2006, 12 Pages.

Final Office Action received for U.S. Appl. No. 10/654,573, mailed on Jul. 25, 2007, 11 Pages.

Final Office Action received for U.S. Appl. No. 10/654,573, mailed on Jun. 7, 2010, 21 Pages.

Final Office Action received for U.S. Appl. No. 10/654,573, mailed on Jun. 24, 2008, 14 Pages.

Final Office Action received for U.S. Appl. No. 10/654,573, mailed on Jun. 30, 2011, 23 Pages.

Non-Final Office Action received for U.S. Appl. No. 10/654,573, mailed on Dec. 21, 2010, 29 Pages.

Non-Final Office Action received for U.S. Appl. No. 10/654,573, mailed on Dec. 29, 2005, 11 Pages.

Non-Final Office Action received for U.S. Appl. No. 10/654,573, mailed on Feb. 09, 2007, 11 Pages.

Non-Final Office Action received for U.S. Appl. No. 10/654,573, mailed on Jan. 23, 2008, 12 Pages.

Non-Final Office Action received for U.S. Appl. No. 10/654,573, mailed on May 11, 2009, 14 Pages.

Non-Final Office Action received for U.S. Appl. No. 10/654,573, mailed on Nov. 25, 2009, 30 Pages.

Notice of Allowance received for U.S. Appl. No. 10/654,573, mailed on Dec. 27, 2011, 13 Pages.

Final Office Action received for U.S. Appl. No. 13/440,096, mailed on Apr. 22, 2013, 27 Pages.

Final Office Action received for U.S. Appl. No. 13/440,096, mailed on Jun. 12, 2015, 9 Pages.

Non-Final Office Action received for U.S. Appl. No. 13/440,096, mailed on Jun. 5, 2012, 13 Pages.

Non-Final Office Action received for U.S. Appl. No. 13/440,096, mailed on Mar. 25, 2014, 16 Pages.

Non-Final Office Action received for U.S. Appl. No. 13/440,096, mailed on Nov. 4, 2014, 25 Pages.

Final Office Action received for U.S. Appl. No. 13/619,832, mailed on Jun. 13, 2014, 35 Pages.

Non-Final Office Action received for U.S. Appl. No. 13/619,832, mailed on Mar. 28, 2013, 10 Pages.

Non-Final Office Action received for U.S. Appl. No. 13/619,832, mailed on Oct. 1, 2013, 23 Pages.

Notice of Allowance received for U.S. Appl. No. 13/619,832, mailed on Mar. 30, 2015, 8 Pages.

Final Office Action received for U.S. Appl. No. 13/619,919, mailed on Jun. 12, 2015, 19 Pages.

Final Office Action received for U.S. Appl. No. 13/619,919, mailed on Nov. 25, 2013, 23 Pages.

Non-Final Office Action received for U.S. Appl. No. 13/619,919, mailed on Mar. 27, 2013, 10 Pages.

(56) References Cited

OTHER PUBLICATIONS

Non-Final Office Action received for U.S. Appl. No. 13/619,919, mailed on Oct. 1, 2014, 20 Pages.

Non-Final Office Action received for U.S. Appl. No. 13/942,660, mailed on Sep. 30, 2013, 26 Pages.

Notice of Allowance received for U.S. Appl. No. 13/942,660, mailed on Oct. 7, 2014, 9 Pages.

Bernstein, et al., "Solutions and Debugging for Data Consistency in Multiprocessors with Noncoherent Caches", vol. 23, No. 1, Feb. 1995, 21 pages.

* cited by examiner

MFENCE AND LFENCE MICRO-ARCHITECTURAL IMPLEMENTATION METHOD AND SYSTEM

CROSS REFERENCE TO OTHER APPLICATIONS

The present application is a continuation of U.S. patent application Ser. No. 13/440,096, filed on Apr. 5, 2012, entitled, "MFENCE AND LFENCE MICRO-ARCHITECTURAL IMPLEMENTATION METHOD AND SYSTEM," now pending, which is a continuation of U.S. patent application Ser. No. 10/654,573, filed on Sep. 2, 2003, entitled, "METHOD AND SYSTEM FOR ACCESSING MEMORY IN PARALLEL COMPUTING USING LOAD FENCING INSTRUCTIONS", now U.S. Pat. No. 8,171,261, which is a continuation of U.S. patent application Ser. No. 10/194,531, filed Jul. 12, 2002, entitled "MFENCE AND LFENCE MICRO-ARCHITECTURAL IMPLEMENTATION METHOD AND SYSTEM", now U.S. Pat. No. 6,651,151, which is a continuation of U.S. patent application Ser. No. 09/475,363, filed Dec. 30, 1999, entitled "MFENCE AND LFENCE MICRO-ARCHITECTURAL IMPLEMENTATION METHOD AND SYSTEM", now U.S. Pat. No. 6,678,810. The U.S. patent application Ser. Nos. 13/440,096, 10/654,573, 10/194,531, and 09/475,363 are hereby incorporated herein by this reference.

BACKGROUND

1. Field of the Invention

The present invention relates in general to computer architecture and in particular to a method and system of organizing memory access.

2. Description of the Related Art

Video, graphics, communications and multimedia applications require high throughput processing power. As consumers increasingly demand these applications, microprocessors have been tailored to accelerate multimedia and communications applications.

Media extensions, such as the Intel MMX™ technology, introduced an architecture and instructions to enhance the performance of advanced media and communications applications, while preserving compatibility with existing software and operating systems. The new instructions operated in parallel on multiple data elements packed into 64-bit quantities. The instructions accelerated the performance of applications with computationally intensive algorithms that performed localized, reoccurring operations on small native data. These multimedia applications included: motion video, combined graphics with video, image processing, audio synthesis, speech synthesis and compression, telephony, video conferencing, and two and three-dimensional graphics applications.

Although parallel operations on data can accelerate overall system throughput, a problem occurs when memory is shared and communicated among processors. For example, suppose a processor performs data decompression of a video image. If a memory load or store occurs from an external agent or another processor while the data image is not complete, the external agent would receive incomplete or corrupt image data. Moreover, the situation becomes particularly acute, as many multimedia applications now require communications and data exchange between many external agents, such as external graphics processors.

Thus, what is needed is a method and system that allow computer architecture to perform computations in parallel, yet guarantee the integrity of a memory access or store.

SUMMARY

The load fencing process and system receives a load fencing instruction that separates memory load instructions into older loads and newer loads. A load buffer within the memory ordering unit is allocated to the instruction. The load instructions newer than the load fencing instruction are stalled. The older load instructions are gradually retired. When all older loads from the memory subsystem are retired, the load fencing instruction is dispatched.

BRIEF DESCRIPTION OF THE DRAWINGS

The inventions claimed herein will be described in detail with reference to the drawings in which reference characters identify correspondingly throughout and wherein:

DETAILED DESCRIPTION

It is possible to order the execution of memory access in computer architecture. The method and system of implementing this memory "fencing" will be discussed in the terms of two memory fence instructions—a memory fence ("MFENCE") and a memory load fence ("LFENCE"). These instructions complement the use of SFENCE, an existing Intel MMX2™ instruction. Neither instruction has an associated address or data operand.

MFENCE guarantees that every memory access that precedes it, in program order, is globally visible prior to any memory instruction that follows it, in program order. Memory accesses include loads, stores, and other fence and serializing instructions. MFENCE is therefore strongly ordered with respect to other memory instructions, regardless of their memory type.

In the Intel family of P6 microprocessors (for example, Pentium II™, and Celeron™ processors), a micro-operation, "store_address_fence," serializes prior and subsequent micro-operations. The micro-operation dispatches "at-retirement," and it executes only once all older operations have fully completed; i.e., all L1 cache controller buffers are empty. Similarly, MFENCE is also dispatched "at-retirement"; however, MFENCE provides slightly better performance than the existing "store_address_fence," since it is allowed to execute once all prior instructions have been globally observed, not necessarily completed.

The LFENCE instruction can be contrasted to SFENCE. SFENCE also dispatches "at-retirement," and it executes once all older stores, in program order, have been globally observed; however, it does not fence loads. LFENCE guarantees that every load that precedes it, in program order, is globally visible prior to any load that follows it, in program order. It prevents speculative loads from passing the LFENCE instruction. LFENCE is also ordered with respect to other LFENCE instructions, MFENCE instructions, and serializing instructions, such as CPUID. It is not ordered with respect to stores or the SFENCE instruction. Like with MFENCE, the behavior of LFENCE is independent of its memory type.

Figure 1:
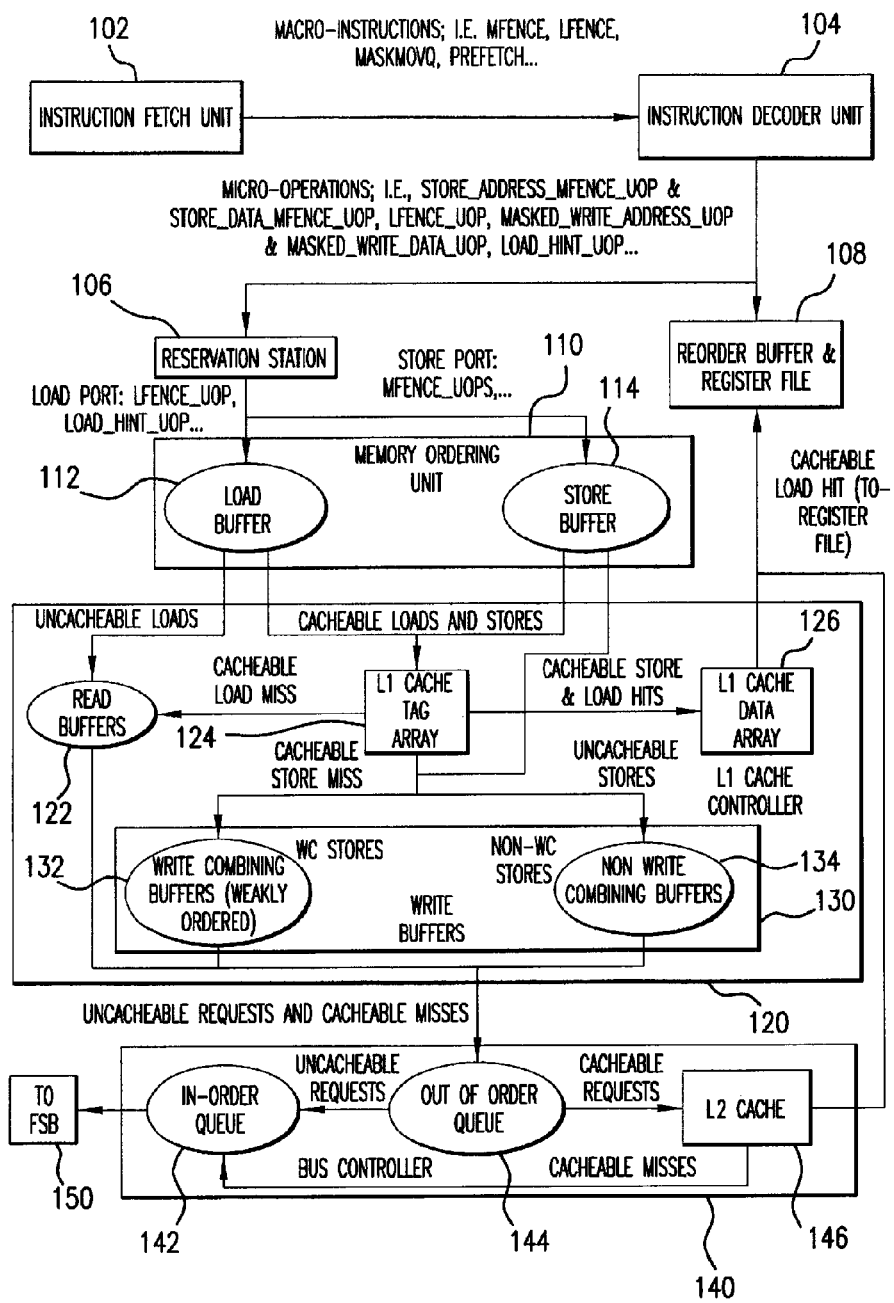
FIG. 1 illustrates instruction flow through microprocessor architecture.

In FIG. 1, an example microprocessor memory and bus subsystem is depicted with the flow of memory loads and stores. FIG. 1 shows two cache levels in the microprocessor: an on-chip ("L1") cache being the cache level closest to the processor, and second level ("L2") cache being the cache level farthest from the processor. An instruction fetch unit 102 fetches macroinstructions for an instructions decoder unit 104. The decoder unit 104 decodes the macroinstructions into a stream of microinstructions, which are forwarded to a reservation station 106, and a reorder buffer and register file 108. As an instruction enters the memory subsystem, it is allocated in the load 112 or store buffer 114, depending on whether it is a read or a write memory macroinstruction, respectively. In the unit of the memory subsystem where such buffers reside, the instruction goes through memory ordering checks by the memory ordering unit 110. If no memory dependencies exist, the instruction is dispatched to the next unit in the memory subsystem after undergoing the physical address translation. At the L1 cache controller 120, it is determined whether there is an L1 cache hit or miss. In the case of a miss, the instruction is allocated into a set of buffers, from where it is dispatched to the bus sub-system 140 of the microprocessor. In case of a cacheable load miss, the instruction is sent to read buffers, 122, or in the case of a cacheable store miss, the instruction is sent to write buffers 130. The write buffers may be either weakly ordered write combining buffers 132 or non-write combining buffers 134. In the bus controller unit 140, the read or write micro-operation is allocated into an out-of-order queue 144. If the micro-operation is cacheable, the L2 cache 146 is checked for a hit/miss. If a miss, the instruction is sent through an in-order queue 142 to the frontside bus 150 to retrieve or update the desired data from main memory.

As it can be seen in FIG. 1, the MFENCE and LFENCE flow through the microprocessor is slightly different to that of a memory load or store. MFENCE and LFENCE never check the L1 cache 124, 126 or the L2 cache 146 and never allocate a buffer in the L1 cache controller 120. Consequently, neither instruction ever reaches the bus controller 140. They are last allocated in a hardware structure in the memory-ordering unit 110; i.e., store and load buffers 114, 112 for MFENCE and LFENCE, respectively.

LFENCE is dispatched on the memory ordering unit 110 load port, and MFENCE is dispatched on the memory ordering unit 110 store port. Their data fields are always ignored by the memory subsystem.

The memory ordering constraints of the MFENCE and LFENCE macroinstructions are seen below in Tables 1 and 2 and are compared with SFENCE.

TABLE 1

Memory ordering of instructions with respect to later MFENCE and LFENCE macroinstructions

| Earlier access | Later access | | |
|---|---|---|---|
| | MFENCE | LFENCE | SFENCE |
| Non-senior load | N | N | Y* |
| Senior load | N | N | Y* |
| Store | N | Y* | N |
| CLFLUSH | N | Y* | Y* |
| MFENCE | N | N | N |
| LFENCE | N | N | Y* |
| SFENCE | N | Y* | N |

Note:
N = Cannot pass, Y = can pass.
*= Dependent on hardware implementation, this ordering constraints can be more restrictive; while still adhering to the architectural definition of the macroinstruction.

TABLE 2

Memory ordering of instructions with respect to earlier MFENCE and LFENCE macroinstructions

| Earlier access | Later access | | | | | | |
|---|---|---|---|---|---|---|---|
| | Non-senior Load | Senior load | Store | CLFLUSH | MFENCE | LFENCE | SFENCE |
| MFENCE | N | N | N | N | N | N | N |
| LFENCE | N | N | Y* | Y* | N | N | Y* |
| SFENCE | Y* | Y* | N | Y* | N | Y* | N |

Note:
N = Cannot pass, Y = can pass.
*Dependent on hardware implementation, this ordering constraints can be more restrictive; while still adhering to the architectural definition of the macroinstruction.

When using fencing instructions other than MFENCE, such as LFENCE or SFENCE, strong ordering with respect to a cache line flush ("CLFLUSH") macroinstruction cannot be guaranteed. The former two instructions only serialize loads (LFENCE) or stores (SFENCE), respectively, but not both.

Take for example the code below. Masked stores write to address [x]. All instructions except MFENCE target cache line at address [x]:

```
PREFETCH [x]
MASKMOVQ data 1, mask 1
MFENCE
CLFLUSH [x]
MFENCE
MASQMOVQ data 2, mask 2
```

In the example code above, the intent of the programmer is to prefetch line [x] into the L1 cache. Then, write data1 (assuming mask1=all 1's) to line [x], flush the line out to main memory, and write data2 (assuming mask2=all 1's) to line [x] in main memory (line [x] no longer is in the cache hierarchy).

However, if the SFENCE macroinstruction were used in place of MFENCE, the PREFETCH macroinstruction could potentially execute after the cache line flush macroinstruction. In this case, the final location of the data would be in the cache hierarchy, with the intent of the cache line flush having been nullified. The SFENCE macroinstruction serializes stores with respect to itself; but it allows senior loads, such as the PREFETCH macroinstruction, to be executed out-of-order.

Alternatively, if the LFENCE macroinstruction were used in place of MFENCE, the cache line flush macroinstruction could potentially execute out of order with respect to the older MASKMOVQ. This behavior would nullify the effect of the PREFETCH macroinstruction. Both MASKMOVQ instructions would update main memory. Dependent on the hardware implementation chosen for LFENCE, a cache line flush could also potentially execute out of order with respect to the PREFETCH macroinstruction. In this case, the original intent of the cache line flush macroinstruction is never achieved, and the final location of the line is the local cache.

MFENCE is the only of three fencing macroinstructions (i.e., MFENCE, LFENCE and SFENCE) that will serialize all memory instructions, including a cache line flush. Using MFENCE, strong ordering is achieved, as shown in the above example code.

There are two alternative hardware embodiments for the MFENCE and LFENCE macroinstructions based on the behavior of senior loads. The latter can either retire from the L1 cache controller unit 120 or from the memory-ordering unit 110, depending on the hardware implementation chosen. In either case, "senior loads" are retired from the memory subsystem of the microprocessor prior to execution.

Figure 2:
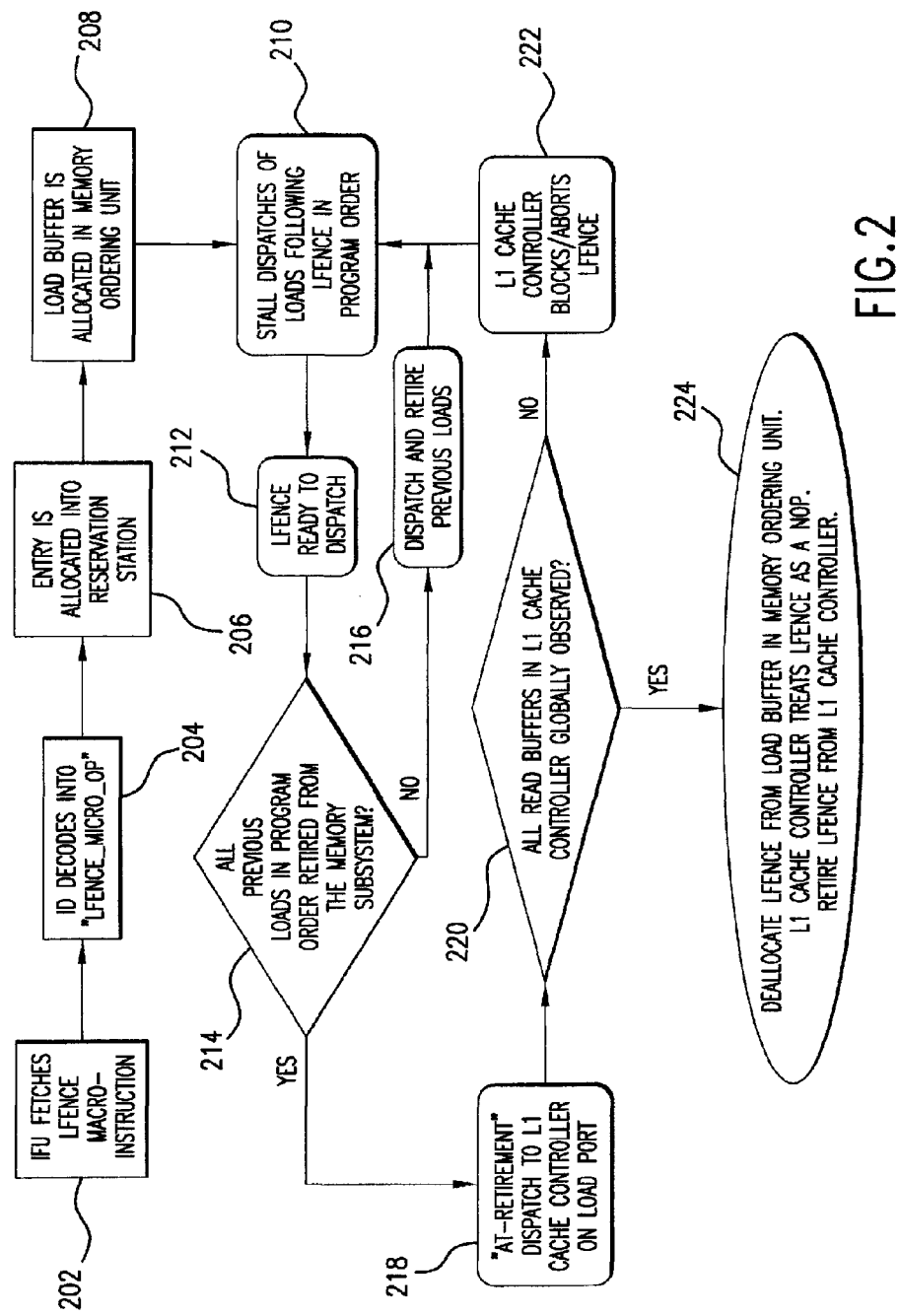
FIG. 2 flowcharts an embodiment of the load fencing (LFENCE) process with senior loads retiring from the L1 cache controller.

Turning to FIG. 2, a flowchart depicts a load fence (LFENCE) embodiment where senior loads retire from the L1 cache controller unit 120. In such an embodiment, senior loads cannot be retired unless they are dispatched from the memory ordering unit 110, and accepted by the L1 cache controller 120. This is the case where there is no L1 cache controller 120 blocking condition. The senior load is retired from the memory subsystem upon a L1 cache hit; alternatively in the case of a L1 cache miss, the senior load is retired upon allocation of the incoming senior load in a read buffer 122 in the L1 cache controller 120.

Initially, the instruction fetch unit 102 fetches an LFENCE macroinstruction, block 202. The instruction is decoded by the instruction decoder unit 104 into its constituent microinstruction operation, block 204. In block 206, an entry is allocated into the reservation station 106. A load buffer 112 is allocated in the memory ordering unit 110, block 208. The load dispatches that follow (in program order) the LFENCE instruction are stalled, block 210. The process moves to block 212, when the LFENCE is ready to dispatch.

If not all older loads in program order are retired from the memory subsystem, as determined by decision block 214, the LFENCE is dispatched and older loads are retired in block 216, then the flow returns to block 210.

"At-retirement" loads are not dispatched from the memory ordering unit 110 until all older loads have been retired from the memory subsystem, as determined by decision block 214. Therefore, with this hardware embodiment for senior loads, "at-retirement" loads dispatch from the memory-ordering unit 110 in program order with respect to other loads, block 218. Flow continues to decision block 220.

In decision block 220, it is determined whether all read buffers 122, in the L1 cache controller 120, are globally observed. If not all read buffers 122 are globally observed, the L1 cache controller 120 blocks or aborts the LFENCE instruction in block 222, and then flow returns to block 210.

If all read buffers 122 are globally observed, as determined by block 220, flow ends in block 224, when the LFENCE is deallocated from the load buffer 112 in the memory ordering unit 110. The L1 cache controller 120 treats the LFENCE instruction as a non-operation (NOP), and the LFENCE is retired from the L1 cache controller 120.

It is worth noting that the LFENCE does not execute out of order with respect to older loads, because the LFENCE instruction is dispatched "at-retirement" from the memory-ordering unit 110 on the load port. Thus, all older loads in program order have been retired from the memory subsystem of the microprocessor.

Similarly, newer loads do not execute out of order with respect to a LFENCE. A new control bit is added to each entry in the load buffers 112 in the memory-ordering unit 110. It is set when a given entry is allocated to service a LFENCE operation; otherwise, it is cleared. The tail pointer points to the next entry to be deallocated form the load buffer 112, which is the oldest load in the machine. This implies that all older loads have been completed and deallocated. The corresponding dispatch is stalled if any load buffer 112 entry between the tail pointer and the L1 cache controller 120 dispatch entry has the control bit set. The control bit being set indicates that there is an LFENCE operation between the oldest load in the machine and the load for which a dispatch was attempted. The latter load cannot be dispatched out of order with respect to the LFENCE, and it is consequently stalled until retirement of the LFENCE. The retirement of the LFENCE occurs the tail pointer passes LFENCE instruction.

A memory fence (MFENCE) can be thought of as a more restrictive embodiment of the load fence in which an LFENCE dispatches an "all blocking" micro-operation from the store port. In such an embodiment, shown in FIG. 3, the MFENCE instruction is allocated in the store buffers 114, instead of load buffers 112. It has the disadvantage of serializing both loads and stores. This can be thought of as mapping the LFENCE micro-operation to the MFENCE micro-operation.

Figure 3:
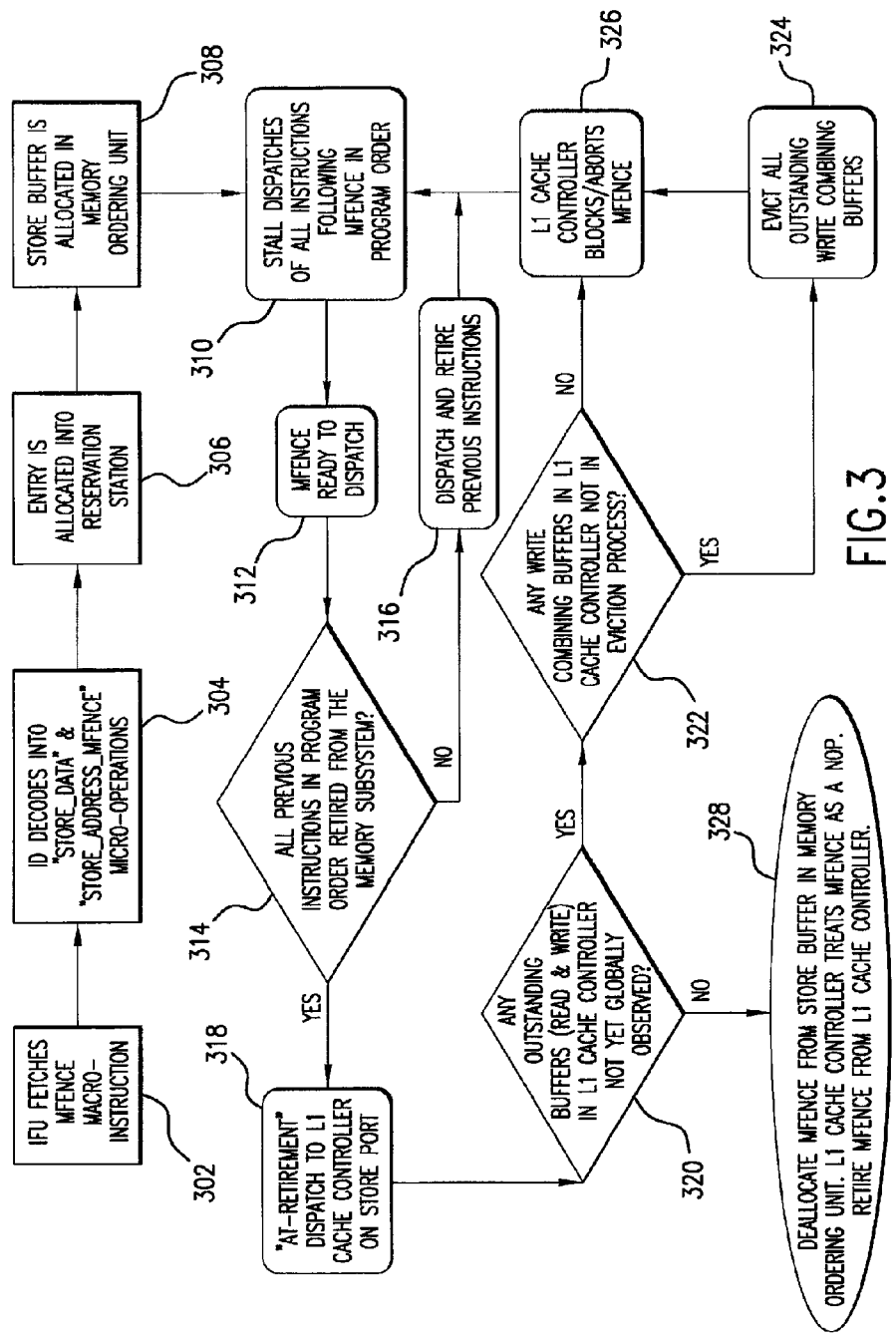
FIG. 3 flowcharts an embodiment of the memory fencing (MFENCE) process with senior loads retiring from the L1 cache controller.

In FIG. 3, a flowchart depicts a memory fence (MFENCE) embodiment where senior loads and stores retire from the L1 cache controller unit 120. In such an embodiment, senior instructions cannot be deallocated from the store buffer in the memory unit unless they are dispatched from the memory-ordering unit 110, and accepted by the L1 cache controller 120. This is the case where there is no L1 cache controller 120 blocking condition. The senior instructions are retired from the memory subsystem upon a L1 cache hit; alternatively in the case of a L1 cache miss, the senior instructions are retired upon allocation of the incoming senior instructions in a read buffer 122 in the L1 cache controller 120.

Initially, the instruction fetch unit 102 fetches an MFENCE macroinstruction, block 302. The instruction is decoded by the instruction decoder unit 104 into its constituent microinstruction operation, block 304. In block 306, an entry is allocated into the reservation station 106. A store buffer 114 is allocated in the memory ordering unit 110, block 308. The store dispatches that follow (in program order) the MFENCE instruction are stalled, block 310. The process moves to block 312, when the MFENCE is ready to dispatch.

If not all older memory access instructions in program order are retired from the memory subsystem, as determined by decision block 314, the MFENCE is dispatched and older instructions are retired in block 316, then the flow returns to block 310.

Decision block 314 determines whether all older memory access instructions have been retired from the memory subsystem before "at-retirement" instructions are dispatched from the memory ordering unit 110. Therefore, with this hardware embodiment for senior instructions, "at-retirement" instructions dispatch from the memory-ordering unit 110 in program order with respect to other instructions, block 318. Flow continues to decision block 320.

In decision block 320, it is determined whether any outstanding read buffers 122 or write buffers 130, in the L1 cache controller 120, are globally observed. If not all the buffers 122, 130 are globally observed, flow moves to block 322. In decision block 322, it is determined whether any write combining buffers 132 in the L1 cache controller 120 are not in the eviction process. If write combining buffers 132 are in the eviction process, the L1 cache controller 120 blocks or aborts the MFENCE instruction in block 326, and then flow returns to block 310. If there are no write combining buffers 132 in the eviction, process, all outstanding write combining buffers 132 are evicted, block 324, and flow moves to block 326.

Returning to decision block 320, if all outstanding read buffers 122 or write buffers 130 are already globally observed, flow ends in block 328, when the MFENCE is deallocated from the store buffer 114 in the memory ordering unit 110. The L1 cache controller 120 treats the MFENCE instruction as a non-operation (NOP), and the MFENCE is retired from the L1 cache controller 120.

To ensure the MFENCE instruction does not execute out of order with respect to earlier memory instructions, and later memory instructions do not execute out of order with respect to MFENCE, MFENCE is dispatched as an "all blocking" micro-operation from the memory ordering unit 110 on the store port.

Figure 4:
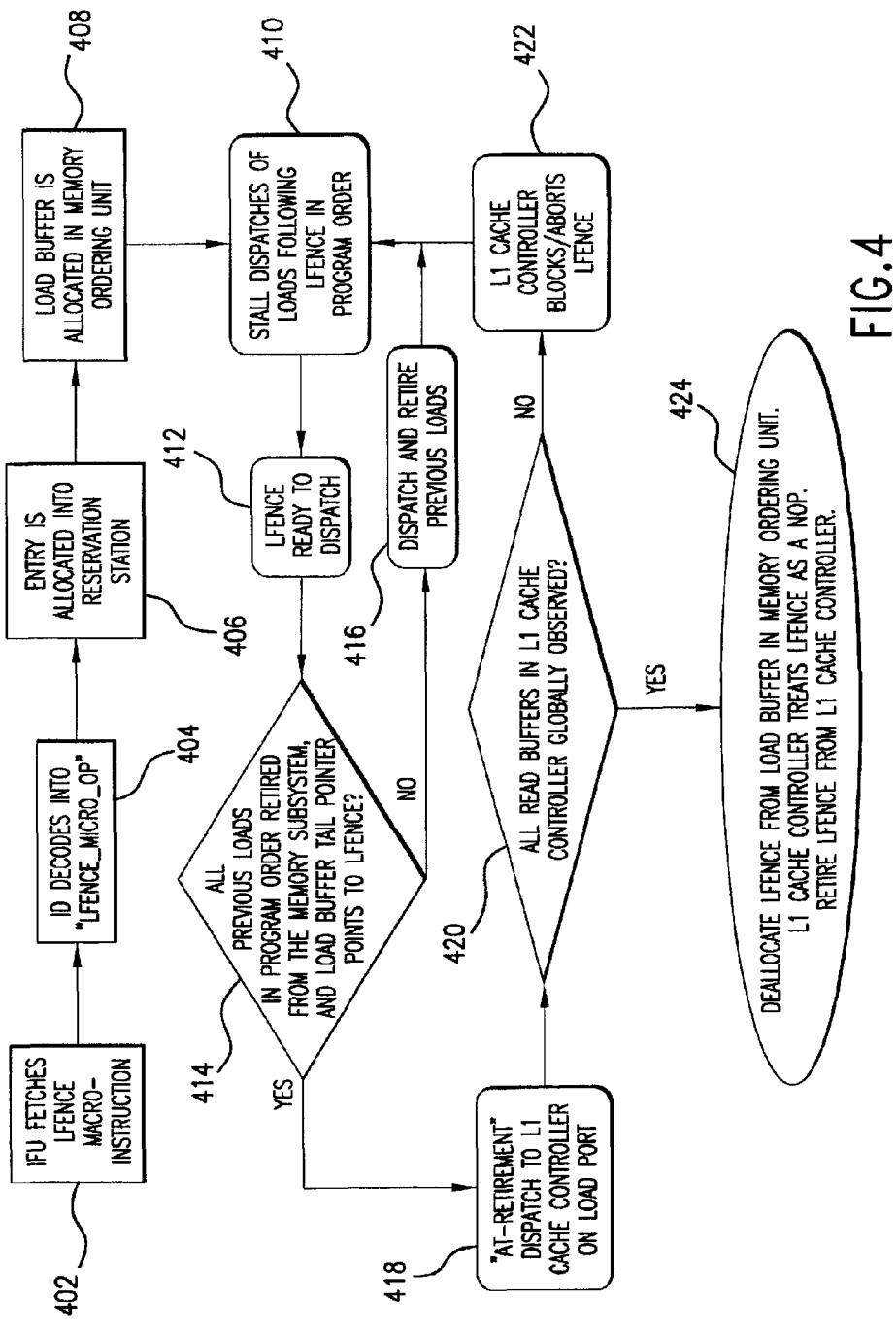
FIG. 4 flowcharts an embodiment of the load fencing (LFENCE) process with senior loads retiring from the memory ordering unit.

In an alternate hardware embodiment, senior loads retire from the memory-ordering unit 110. In this embodiment, depicted in FIG. 4, senior loads can be retired upon their first dispatch from the memory-ordering unit 110, even if the L1 cache controller 120 did not accept the senior load. Such an example includes an L1 cache controller 120 blocking condition. In this implementation, it is possible for a senior load to be retired from the memory subsystem of the microprocessor, and an entry in the load buffer 112 can still remain allocated with this senior load for subsequent re-dispatch to the L1 cache controller 120. It is therefore possible for a younger "at-retirement" load (i.e., an uncachable load) to execute out of order with respect to an older senior load.

The instruction fetch unit 102 fetches an LFENCE macroinstruction, block 402. The instruction is decoded by the instruction decoder unit 104 into its constituent microinstruction operation, block 404. In block 406, an entry is allocated into the reservation station 106. A load buffer 112 is allocated in the memory ordering unit 110, block 408. The load dispatches that follow (in program order) the LFENCE instruction are stalled, block 410. The process moves to block 412, when the LFENCE is ready to dispatch.

If not all older loads in program order are retired from the memory subsystem, and the load buffer 112 tail pointer is pointing to the LFENCE instruction, as determined by decision block 414, the LFENCE is dispatched and older loads are retired in block 416, then the flow returns to block 410.

"At-retirement" loads are not dispatched from the memory ordering unit 110 until all older loads have been retired from the memory subsystem, and the load buffer tail pointer points to the LFENCE instruction, as determined by decision block 414. Therefore, with this hardware embodiment for senior loads, "at-retirement" loads dispatch from the memory-ordering unit 110 in program order with respect to other loads, block 418. Flow continues to decision block 420.

In decision block 420, it is determined whether all read buffers 122, in the L1 cache controller 120, are globally observed. If not all read buffers 422 are globally observed, the L1 cache controller 120 blocks or aborts the LFENCE instruction in block 422, and then flow returns to block 410.

If all read buffers 122 are globally observed, as determined by block 420, flow ends in block 424, when the LFENCE is deallocated from the load buffer 112 in the memory ordering unit 110. The L1 cache controller 120 treats the LFENCE instruction as a non-operation (NOP), and the LFENCE is retired from the L1 cache controller 120.

It is worth noting that the LFENCE does not execute out of order with respect to older loads, because the LFENCE instruction is not dispatched from the memory-ordering unit until two conditions are met. The first condition is that the corresponding load buffer entry is pointed to by the reorder buffer retirement pointer. The second condition is that the corresponding load buffer entry is also pointed to by the load buffer tail pointer. The retirement pointer indicates all older instructions have been retired, and the tail pointer points to the next entry to be deallocated from the load buffer. The tail pointer can also be thought of as pointing to the oldest load in the machine.

Furthermore, newer loads do not execute out of order with respect to an LFENCE instruction. This is because LFENCE uses the same implementation as for the case described earlier with senior loads retiring from the L1 cache controller. A control bit is added for each load buffer entry. Prior to a load dispatch, the value of this control bit is checked for each entry between the one pointed to by the tail pointer and the one for which a memory dispatch is being attempted.

Similarly, an MFENCE instruction can be implemented where senior loads retire from the memory-ordering unit 110. In this embodiment, an MFENCE does not execute out of order with respect to older memory instructions, nor do any younger memory instructions execute out of order with respect to the MFENCE. In such an embodiment, an additional micro-operation is required to implement the MFENCE. In an embodiment described earlier for supporting MFENCE with senior loads retiring from the L1 cache controller, the MFENCE could be implemented as a set of two micro-operations on the store port. Those two micro-operations are "store_data" (the data is ignored) and "store_address_mfence". In the current embodiment, three micro-operations are needed to implement MFENCE and support senior loads retiring from the memory-ordering unit. These micro-operations are: an "LFENCE" micro-operation, a "Store-data" micro-operation, and a "Store_address_MFENCE" micro-operation. The first micro-operation can be the same as the LFENCE embodiment described to support senior loads retiring from the memory-ordering unit 110. The last two micro-operations are the same as those used to implement MFENCE and support senior loads retiring from the L1 cache controller 110. The micro-operations are "all blocking" micro-operations dispatched from the memory ordering unit on the store port.

Figure 5:
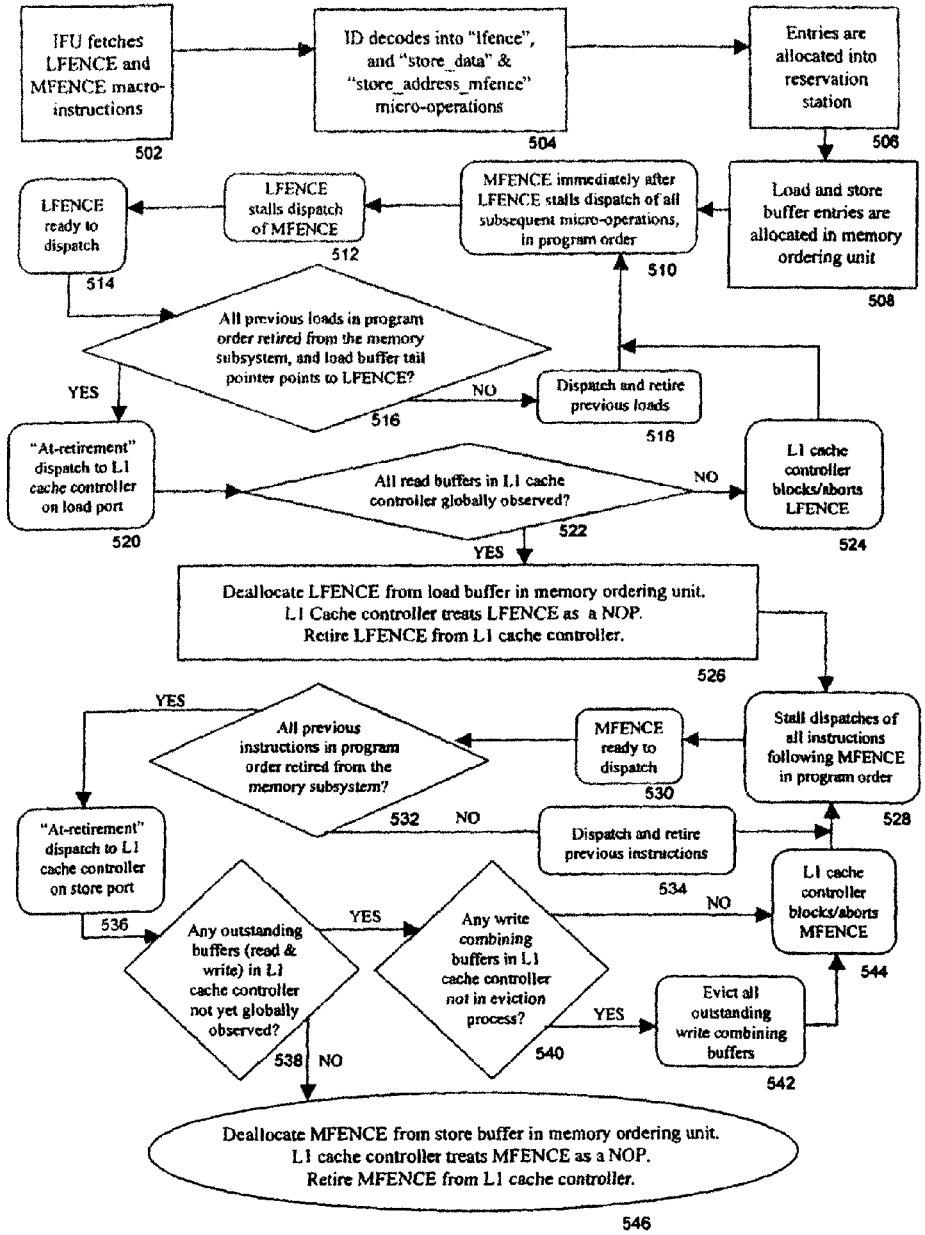
FIG. 5 flowcharts an embodiment of the memory fencing (MFENCE) process with senior loads retiring from the memory-ordering unit.

As shown in FIG. 5, the instruction fetch unit 102 fetches an MFENCE macroinstruction, block 502. The instruction is decoded by the instruction decoder unit 104 into its constituent microinstruction operations, block 504. In block 506, an entry is allocated into the reservation station 106. A load buffer 112 and store buffer 114 entries are allocated in the memory ordering unit 110, block 508. The load dispatches that follow (in program order) the LFENCE instruction are stalled and then the MFENCE micro-operation is performed, block 510. The process moves to block 512, when the LFENCE stalls the dispatch of the MFENCE micro-operation. In block 514, the LFENCE is ready to dispatch.

If not all older loads in program order are retired from the memory subsystem, and the load buffer 112 tail pointer points to the LFENCE instruction, as determined by decision block 516, the LFENCE is dispatched and older loads are retired in block 518, then the flow returns to block 510.

Conversely, the "at-retirement" loads are dispatched from the memory ordering unit 110 when all older loads have been retired from the memory subsystem and the load buffer 112 tail pointer points to the LFENCE instruction, as determined by decision block 516. Therefore, with this hardware embodiment for senior loads, "at-retirement" loads dispatch from the L1 cache controller on the load port, block 520. Flow continues to decision block 522.

In decision block 522, it is determined whether any outstanding read buffers 122, in the L1 cache controller 120, are globally observed. If not all the read buffers 122, are globally observed, flow moves to block 524. At block 524, the L1 cache controller the L1 cache controller 120 blocks or aborts the LFENCE instruction.

If all the read buffers 122, are globally observed, flow moves to block 526.

At block 526, the L1 cache controller 120 treats the LFENCE instruction as a non-operation (NOP), and the LFENCE is retired from the L1 cache controller 120. Flow continues at block 528.

All instruction dispatches following the MFENCE, in program order, are stalled, block 528.

The process moves to block 530, when the MFENCE is ready to dispatch.

If not all older memory access instructions in program order are retired from the memory subsystem, as determined by decision block 532, the MFENCE is dispatched and older memory access instructions are retired in block 534, then the flow returns to block 528.

Decision block 532 determines whether all older instructions have been retired from the memory subsystem before "at-retirement" instructions are dispatched from the memory ordering unit 110. Therefore, with this hardware embodiment for senior memory instructions, "at-retirement" instructions dispatch from the memory-ordering unit 110 in program order with respect to other instructions, block 536. Flow continues to decision block 538.

In decision block 538, it is determined whether any outstanding read buffers 122 or write buffers 130, in the L1 cache controller 120, are globally observed. If not all the buffers 122, 130 are globally observed, flow moves to block 540.

At decision block 540, it is determined whether any write combining buffers 132 in the L1 cache controller 120 are not in the eviction process. If write combining buffers 132 are in the eviction process, the L1 cache controller 120 blocks or aborts the MFENCE instruction in block 544, and then flow returns to block 528. If there are no write combining buffers 132 in the eviction, process, all outstanding write combining buffers 132 are evicted, block 542, and flow moves to block 544.

Returning to decision block 538, if all outstanding read buffers 122 or write buffers 130 are already globally observed, flow ends in block 546, when the MFENCE is deallocated from the store buffer 114 in the memory ordering unit 110. The L1 cache controller 120 treats the MFENCE instruction as a non-operation (NOP), and the MFENCE is retired from the L1 cache controller 120.

Regardless of the implementation, LFENCE is always dispatched from the memory-ordering unit 110 to the rest of the memory subsystem once it is guaranteed to be the oldest load in the machine.

Upon its dispatch from the memory-ordering unit 110, the LFENCE instruction is blocked by the L1 cache controller 120 if there are read buffers 122 not yet globally observed. The memory ordering unit 110 keeps redispatching the LFENCE until all read buffers 122 in the L1 cache controller 120 are globally observed. Once the L1 cache controller 120 accepts the incoming LFENCE, it is retired from the memory subsystem, and it is treated as a non-operation. Consequently, the instruction is never allocated a buffer, nor are any cache hit/miss checks performed.

Upon its dispatch from the memory-ordering unit 110, MFENCE is blocked by the L1 cache controller 120 if there are any outstanding operations in the L1 cache controller 120 not yet globally observed. If blocked, the MFENCE instruction evicts any outstanding write combining buffers 132. Once the L1 cache controller 120 accepts the incoming MFENCE instruction, it is treated as a non-operation and is retired from the memory subsystem. Note that the L1 cache controller 120 accepts the incoming MFENCE instruction only when all L1 cache controller buffers are globally observed. Just like LFENCE, MFENCE is never allocated a buffer, nor are any cache hit/miss checks performed.

For testability and debug purposes, two non-user visible mode bits can be added to enable/disable the MFENCE and LFENCE macroinstructions. If disabled, the L1 cache controller unit 120 can treat the incoming MFENCE and LFENCE micro-operations as a non-operation, and it does not check for global observation of older instructions. Thus, MFENCE and LFENCE are not blocked if their outstanding buffers in the L1 cache controller 120 not yet globally observed.

In alternate embodiments, the hardware implementation of LFENCE can be mapped to that of MFENCE. The corresponding MFENCE micro-operations can be used for both macroinstructions. This embodiment would still satisfy the architectural requirements of LFENCE, since the MFENCE behavior is more restrictive.

The previous description of the embodiments is provided to enable any person skilled in the art to make or use the system and method. It is well understood by those in the art, that the preceding embodiments may be implemented using hardware, firmware, or instructions encoded on a computer-readable medium. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:
1. A processor comprising:
an instruction prefetch unit to prefetch a cache line of data responsive to a PREFETCH instruction and to store the cache line in a data cache;
an instruction fetch unit to fetch a memory load fence (LFENCE) instruction that does not use a mask field thereof, a memory fence (MFENCE) instruction that does not use a mask field thereof, and a cache line flush (CLFLUSH) instruction;

a first memory ordering portion of the processor responsive to the LFENCE instruction to prevent newer memory load instructions occurring after the LFENCE instruction in program order from being globally visible before older memory load instructions occurring before the LFENCE instruction in the program order are globally visible without causing the processor to stall dispatch of a newer memory store instruction occurring after the LFENCE instruction in the program order; and a second memory ordering portion of the processor responsive to the MFENCE instruction to prevent a CLFLUSH instruction which follows the MFENCE instruction in program order from being globally visible until a PREFETCH instruction preceding the MFENCE instruction in program order has become globally visible.

2. The processor of claim 1, wherein the LFENCE instruction and MFENCE instructions are treated as non-operations (NOPs) by the processor after being dispatched once the older memory load instructions are globally visible, and wherein the older memory load instructions are globally visible but not necessarily completed.

3. The processor of claim 1, wherein the LFENCE instruction and MFENCE instructions comprise macroinstructions.

4. The processor of claim 1, wherein the MFENCE instruction is to cause the processor to ensure that all older memory load instructions and all older memory store instructions, which are each older than the MFENCE instruction in the program order, are globally visible, before all newer memory load instructions and all newer memory store instructions, which are each newer than the MFENCE instruction in the program order, are globally visible.

5. The processor of claim 1, implemented in a computer system also including a graphics processor.

6. The processor of claim 1, wherein the LFENCE instruction does not use a data field thereof.

7. The processor of claim 1, wherein the MFENCE instruction does not use a data field thereof.

8. A processor comprising:
an instruction prefetch unit to prefetch a cache line of data responsive to a PREFETCH instruction and to store the cache line in a data cache; and
a decoder to decode instructions including a memory fence (MFENCE) instruction wherein the MFENCE instruction does not use a mask field thereof and a cache line flush (CLFLUSH) instruction, the MFENCE instruction to cause the processor to ensure that all older memory load instructions and all older memory store instructions, which are each older than the MFENCE instruction in program order, are globally visible, before all newer memory load instructions and all newer memory store instructions, which are each newer than the MFENCE instruction in the program order, are globally visible, the MFENCE instruction further to prevent a CLFLUSH instruction which follows the MFENCE instruction in program order from becoming globally visible until a PREFETCH instruction preceding the MFENCE instruction in program order has become globally visible.

9. The processor of claim 8, wherein the MFENCE instruction does not use a mask field thereof, and wherein the older memory load instructions are globally visible but not necessarily completed.

10. The processor of claim 8, wherein the MFENCE instruction is treated as a non-operation (NOP) by the processor after being dispatched after all of the older memory load instructions and memory store instructions are globally visible.

11. The processor of claim 8, wherein the MFENCE instruction is also to cause the processor to ensure that an older CLFLUSH instruction that is older than the MFENCE instruction in the program order is globally visible before a newer CLFLUSH instruction that is newer than the MFENCE instruction in the program order is globally visible.

12. The processor of claim 8, wherein the MFENCE instruction comprises a macroinstruction.

13. The processor of claim 8, implemented in a computer system also including a graphics processor.

14. The processor of claim 8, wherein the MFENCE instruction does not use a data field thereof.

15. A processor comprising:
instruction prefetch circuitry to prefetch a cache line of data responsive to a PREFETCH instruction and to store the cache line in a data cache;
an instruction fetch unit to fetch a load fence (LFENCE) instruction that does not use a mask field thereof and a memory fence (MFENCE) instruction that does not use a mask field thereof; and
a decoder to decode the LFENCE instruction and to decode the MFENCE instruction,
wherein a portion of the processor is responsive to the LFENCE instruction to prevent newer memory load instructions occurring after the LFENCE instruction in program order from being globally visible before older memory load instructions occurring before the LFENCE instruction in the program order are globally visible, without causing the processor to stall dispatch of a newer memory store instruction occurring after the LFENCE instruction in the program order, and
the portion of the processor responsive to the MFENCE instruction is to ensure that all older memory load instructions and all older memory store instructions, which are each older than the MFENCE instruction in the program order, are globally visible, before all newer memory load instructions and all newer memory store instructions, which are each newer than the MFENCE instruction in the program order, are globally visible, the portion of the processor responsive to the MFENCE instruction further to prevent a CLFLUSH instruction which follows the MFENCE instruction in program order from becoming globally visible until a PREFETCH instruction preceding the MFENCE instruction in program order has become globally visible.

16. The processor of claim 15, wherein the LFENCE instruction and the MFENCE instruction are each treated as a non-operation (NOP) after being dispatched.

17. The processor of claim 15, wherein the MFENCE instruction is to guarantee strong ordering with respect to a cache line flush instruction but the LFENCE instruction is not to guarantee strong ordering with respect to the cache line flush instruction.

18. The processor of claim 15, wherein the LFENCE instruction does not use a data field thereof.

19. The processor of claim 15, wherein the MFENCE instruction does not use a data field thereof.

* * * * *